United States Patent
Wei et al.

(10) Patent No.: US 12,058,693 B2
(45) Date of Patent: Aug. 6, 2024

(54) USER EQUIPMENT AND METHOD FOR SMALL DATA TRANSMISSION

(71) Applicant: FG Innovation Company Limited, Tuen Mun (HK)

(72) Inventors: Chia-Hung Wei, Taipei (TW); Hai-Han Wang, Taipei (TW); Chie-Ming Chou, Taipei (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 348 days.

(21) Appl. No.: 17/535,651

(22) Filed: Nov. 25, 2021

(65) Prior Publication Data

US 2022/0174723 A1 Jun. 2, 2022

Related U.S. Application Data

(60) Provisional application No. 63/118,832, filed on Nov. 27, 2020.

(51) Int. Cl.
*H04W 72/23* (2023.01)
*H04W 72/21* (2023.01)
(Continued)

(52) U.S. Cl.
CPC ........... *H04W 72/23* (2023.01); *H04W 72/21* (2023.01); *H04W 74/006* (2013.01); *H04W 74/0833* (2013.01)

(58) Field of Classification Search
CPC ... H04W 72/23; H04W 72/21; H04W 74/006; H04W 74/0833
See application file for complete search history.

(56) References Cited

U.S. PATENT DOCUMENTS

2020/0053791 A1* 2/2020 Ozturk .............. H04W 74/0833
2020/0314917 A1* 10/2020 Jeon ...................... H04W 74/08
(Continued)

FOREIGN PATENT DOCUMENTS

| CN | 110537392 | 12/2019 |
|---|---|---|
| CN | 111357380 | 6/2020 |
| WO | 2020204637 | 10/2020 |

OTHER PUBLICATIONS

Vivo, Supporting Small Data Transmission via RA Procedure, 3GPP TSG-RAN WG2 Meeting#111-electronic, E-Meeting, Aug. 17-28, 2020, R2-2006551.

(Continued)

*Primary Examiner* — Rebecca E Song
*Assistant Examiner* — Jean Neptune Rene
(74) *Attorney, Agent, or Firm* — ScienBiziP, P.C.

(57) ABSTRACT

A UE and a method for SDT are provided. The method includes initiating a RA procedure with a BS while the UE is in an RRC_INACTIVE state; transmitting a preamble; receiving a RAR scheduled by first DCI with CRC bits scrambled by a RA-RNTI on a first search space; transmitting first UL data on a first UL resource, being not from a CCCH, scheduled by the RAR; monitoring the first search space for receiving first DL data scheduled by second DCI with CRC bits scrambled by a TC-RNTI indicated by the RAR; applying the TC-RNTI as a C-RNTI while receiving the first DL data; monitoring the second search space for a second UL resource scheduled by third DCI with first CRC bits scrambled by the C-RNTI if the first DL data indicates the search space configuration; otherwise, monitoring the first search space for the second UL resource.

8 Claims, 11 Drawing Sheets

(51) Int. Cl.
  *H04W 74/00*        (2009.01)
  *H04W 74/0833*      (2024.01)

(56) References Cited

U.S. PATENT DOCUMENTS

| | | | | |
|---|---|---|---|---|
| 2021/0112590 A1* | 4/2021 | Kim | ................... | H04W 74/008 |
| 2022/0361023 A1* | 11/2022 | Luo | ...................... | H04L 1/1864 |
| 2022/0368468 A1* | 11/2022 | Xiong | ................... | H04W 76/27 |
| 2023/0319892 A1* | 10/2023 | Zheng | ................... | H04L 5/0053 |
| | | | | 370/329 |

OTHER PUBLICATIONS

Huawei, HiSilicon, Small data transmission with RA-based schemes, 3GPP TSG-RAN WG2 #112-e, Online, Nov. 2-13, 2020, R2-2010280.

3GPP TS 38.213, "3rd Generation Partnership Project; Technical Specification Group Radio Access Network; NR; Physical layer procedures for control (Release 15)", V15.11.0 (Sep. 2020).

3GPP TS 38.331, "3rd Generation Partnership Project; Technical Specification Group Radio Access Network; NR; Radio Resource Control (RRC) protocol specification (Release 15)", V15.11.0 (Sep. 2020).

3GPP TS 38.321, "3rd Generation Partnership Project; Technical Specification Group Radio Access Network; NR; Medium Access Control (MAC) protocol specification (Release 15)", V15.10.0 (Sep. 2020).

\* cited by examiner

USER EQUIPMENT AND METHOD FOR SMALL DATA TRANSMISSION

CROSS-REFERENCE TO RELATED APPLICATION(S)

The present disclosure claims the benefit of and priority to provisional U.S. patent application Ser. No. 63/118,834, filed on Nov. 27, 2020, entitled "SUBSEQUENT DATA TRANSMISSION IN RRC INACTIVE STATE," the content of which is hereby incorporated fully by reference herein into the present disclosure for all purposes.

FIELD

The present disclosure is related to wireless communication, and specifically, to small data transmission (SDT) in wireless communication networks.

BACKGROUND

Abbreviations used in this disclosure include:

| Abbreviation | Full name |
| --- | --- |
| 3GPP | 3rd Generation Partnership Project |
| 5GC | 5G Core |
| ACK | Positive Acknowledgement |
| AS | Access Stratum |
| BS | Base Station |
| BWP | Bandwidth Part |
| CA | Carrier Aggregation |
| CBRA | Contention Based Random Access |
| CC | Component Carrier |
| CCCH | Common Control Channel |
| CE | Control Element |
| CFRA | Contention Free Random Access |
| CN | Core Network |
| CORESET | Control Resource Set |
| CP | Cyclic Prefix |
| C-RNTI | Cell Radio Network Temporary Identifier |
| CRC | Cyclic Redundancy Check |
| CS-RNTI | Configured Scheduling Radio Network Temporary Identifier |
| CSI-RS | Channel Status Information-Reference Signal |
| CSS | Common Search Space |
| DC | Dual Core |
| DCI | Downlink Control Information |
| DL | Downlink |
| DRB | Data Radio Bearer |
| DRX | Discontinuous Reception |
| DTCH | Dedicated Traffic Channel |
| eNB | Evolved Node B |
| EN-DC | E-UTRA NR Dual Connect |
| EPC | Evolved Packet Core |
| FDD | Frequency Division Duplex |
| HARQ | Hybrid Automatic Repeat Request |
| ID | Identifier/Identity |
| IE | Information Element |
| L1 | Layer 1 |
| LCH | Logical Channel |
| LCID | Logical Channel Identity |
| MAC | Medium Access Control |
| MCG | Master Cell Group |
| MCS-C-RNTI | Modulation and Coding Scheme Cell Radio Network Temporary Identifier |
| MIB | Master Information Block |
| Msg3/4/A/B/ | Message 3/4/A/B |
| MSGB-RNTI | Message B Radio Network Temporary Identifier |
| NACK | Negative Acknowledgement |
| NAS | Non-Access Stratum |
| NB | Node B |
| NDI | New Data Indicator |
| NR | New Radio |
| NW | Network |
| OFDM | Orthogonal Frequency Division Multiplexing |
| PCell | Primary Cell |
| PDCCH | Physical Downlink Control Channel |
| PDSCH | Physical Downlink Shared Channel |
| PDU | Protocol Data Unit |
| PHY | Physical (Layer) |
| PRACH | Physical Random Access Channel |
| PSCell | Primary Secondary Cell Group Cell |
| PUCCH | Physical Uplink Control Channel |
| PUSCH | Physical Uplink Shared Channel |
| RA | Random Access |
| RAR | Random Access Response |
| RA-RNTI | Random Access-Radio Network Temporary Identifier |
| RAN | Radio Access Network |
| Rel | Release |
| RNTI | Radio Network Temporary Identifier |
| RRC | Radio Resource Control |
| RS | Reference Signal |
| RSRP | Reference Signal Received Power |
| SCell | Secondary Cell |
| SCG | Secondary Cell Group |
| SCS | Sub Carrier Spacing |
| SCH | Shared Channel |
| SDT | Small Data Transmission |
| SDU | Service Data Unit |
| SFN | System Frame Number |
| SIB | System Information Block |
| SIB1 | System Information Block 1 |
| SpCell | Special Cell |
| SRB | Signaling Radio Bearer |
| SSB | Synchronization Signal Block |
| SUL | Supplementary Uplink |
| TAG | Timing Advance Group |
| TB | Transport Block |
| TC-RNTI | Temporary Cell-Radio Network Temporary Identifier |
| TDD | Time Division Duplex |
| TS | Technical Specification |
| UE | User Equipment |
| UL | Uplink |
| USS | UE Specific Search Space |

Various efforts have been made to improve different aspects of wireless communication for cellular wireless communication systems, such as fifth generation (5G) new radio (NR), by improving data rate, latency, reliability, and mobility in these systems. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art, such as improvements in the SDT.

SUMMARY

The present disclosure is related to small data transmission (SDT) in wireless communication networks.

In a first aspect of the present disclosure, a method of a UE for performing SDT is provided. The method comprises initiating a Random Access (RA) procedure with a Base Station (BS) while the UE is in a Radio Resource Control (RRC)_INACTIVE state; transmitting, to the BS, a preamble; receiving, from the BS, a Random Access Response (RAR) scheduled by first downlink control information (DCI) on a first search space, the first DCI being attached with Cyclic Redundancy Check (CRC) bits scrambled by a Random Access-Radio Network Temporary Identifier (RA-RNTI); transmitting, to the BS, first Uplink (UL) data on a first UL resource scheduled by the RAR, the first UL data not being from a Common Control Channel (CCCH); monitoring the first search space for receiving first Downlink (DL) data scheduled by second DCI, the second DCI being attached with CRC bits scrambled by a Temporary Cell-Radio Network Temporary Identifier (TC-RNTI) that is indicated by the RAR; applying the TC-RNTI as a Cell-Radio Network Temporary Identifier (C-RNTI) while receiving, from the BS, the first DL data; determining whether the first DL data carries a search space configuration that indicates a second search space; monitoring the second search space for a second UL resource scheduled by third DCI if the first DL data indicates the search space configuration, the third DCI being attached with first CRC bits scrambled by the C-RNTI; and monitoring the first search space for the second UL resource scheduled by the third DCI if the first DL data does not indicate the search space configuration.

In an implementation of the first aspect, the first search space is a Common Search Space (CSS) shared with other UEs within a serving cell, and the second search space is a UE specific Search Space (USS).

Another implementation of the first aspect further comprises monitoring the second search space for second DL data scheduled by fourth DCI if the first DL data indicates the search space configuration, the fourth DCI being attached with second CRC bits scrambled by the C-RNTI; and monitoring the first search space for the second DL data scheduled by the fourth DCI if the first DL data does not indicate the search space configuration.

In another implementation of the first aspect, the UE is configured with a timer, and the method further comprises monitoring the second search space for the second UL resource or the second DL data if the first DL data indicates the search space configuration and the timer is running; and monitoring the first search space for the second UL resource or the second DL data if the first DL data does not indicate the search space configuration and the timer is running.

In a second aspect of the present disclosure, a UE in a wireless communication system for performing SDT is provided. The UE comprises at least one processor; and at least one memory coupled to the at least one processor, wherein the at least one memory stores a computer-executable program that, when executed by the at least one processor, causes the UE to initiate a Random Access (RA) procedure with a Base Station (BS) while the UE is in a Radio Resource Control (RRC)_INACTIVE state; transmit, to the BS, a preamble; receive, from the BS, a Random Access Response (RAR) scheduled by first downlink control information (DCI) on a first search space, the first DCI being attached with Cyclic Redundancy Check (CRC) bits scrambled by a Random Access-Radio Network Temporary Identifier (RA-RNTI); transmit, to the BS, first Uplink (UL) data on a first UL resource scheduled by the RAR, the first UL data not being from a Common Control Channel (CCCH); monitor the first search space for receiving first Downlink (DL) data scheduled by second DCI, the second DCI being attached with CRC bits scrambled by a Temporary Cell-Radio Network Temporary Identifier (TC-RNTI) that is indicated by the RAR; apply the TC-RNTI as a Cell-Radio Network Temporary Identifier (C-RNTI) while receiving, from the BS, the first DL data; determine whether the first DL data carries a search space configuration that indicates a second search space; monitor the second search space for a second UL resource scheduled by third DCI if the first DL data indicates the search space configuration, the third DCI being attached with first CRC bits scrambled by the C-RNTI; and monitor the first search space for the second UL resource scheduled by the third DCI if the first DL data does not indicate the search space configuration.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
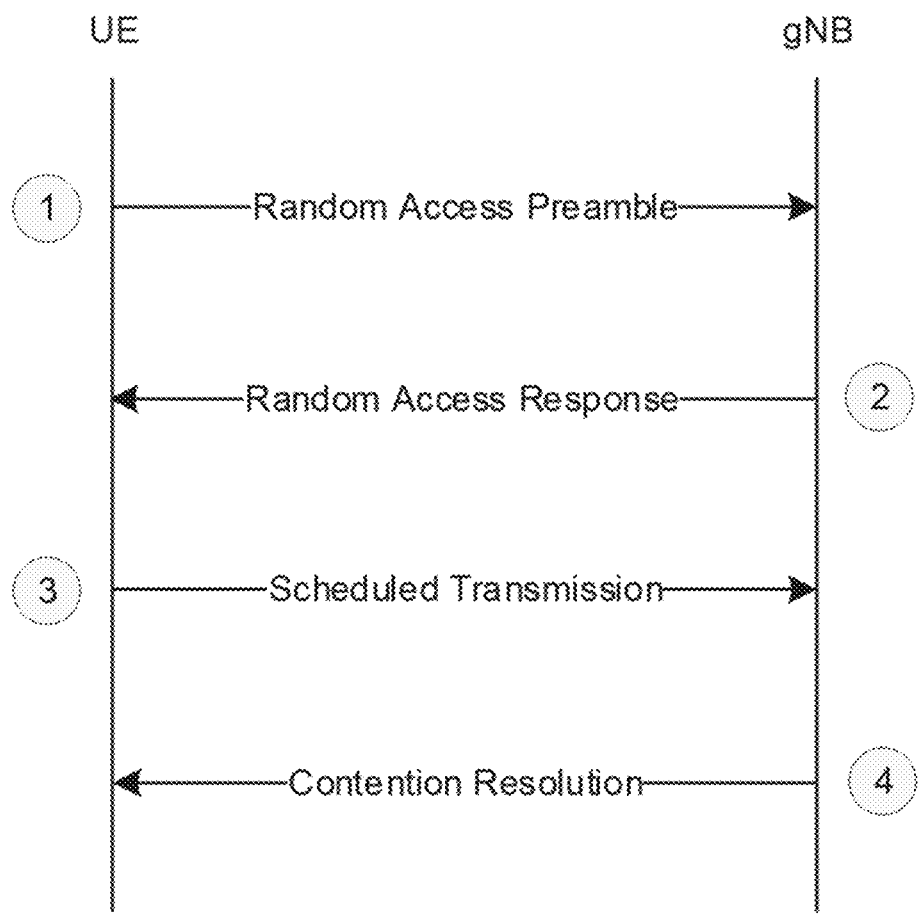
FIG. 1 is a schematic diagram illustrating a 4-step Contention Based Random Access procedure, according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR RAN typically includes at least one BS, at least one UE, and one or more optional network elements that provide connection within a network. The UE communicates with the network such as a CN, an EPC network, an Evolved Universal Terrestrial RAN (E-UTRAN), a 5GC, or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to an NB in the UMTS, an eNB in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. The BS can be referred to as network (NW).

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a MCG or a SCG may be called a SpCell. A PCell may refer to the SpCell of an MCG. A PSCell may refer to the SpCell of an SCG. MCG may refer to a group of serving cells associated with the Master Node (MN), comprising of the SpCell and optionally one or more SCells. An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as eMBB, mMTC, and URLLC, while fulfilling high reliability, high data rate and low latency requirements. The OFDM technology in the 3GPP may serve as a baseline for an NR waveform. The scalable OFDM numerology such as adaptive sub-carrier spacing, channel bandwidth, and CP may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following sentences, paragraphs, (sub)-bullets, points, actions, behaviors, terms, alternatives, aspects, examples, or claims described in the following invention(s) may be combined logically, reasonably, and properly to form a specific method.

Any sentence, paragraph, (sub)-bullet, point, action, behaviors, terms, alternatives, aspects, examples, or claims described in the following invention(s) may be implemented independently and separately to form a specific method.

Dependency, such as "based on", "more specifically", "preferably", "in one embodiment", "in one alternative", "in one example", "in one aspect", "in one implementation", etc., in the present disclosure is just one possible example which would not restrict the specific method.

Examples of some selected terms are provided as follows.

Cell: Radio network object that may be uniquely identified by a UE from a (cell) identification that is broadcast over a geographical area from one UTRAN Access Point. A Cell may be either in FDD mode or in TDD mode.

Serving Cell: For a UE in an RRC_CONNECTED mode not configured with CA/DC, there is only one serving cell comprising of the PCell. For a UE in the RRC_CONNECTED mode configured with CA/DC, the term 'serving cells' is used to denote a set of cells comprising of the Special Cell(s) and one or more SCells.

CA: In CA, two or more CCs are aggregated. A UE may simultaneously receive or transmit on one or multiple CCs depending on its capabilities. CA is supported for both contiguous and non-contiguous CCs. When CA is deployed, frame timing and SFN may be aligned across cells that are aggregated. The maximum number of configured CCs for a UE may be 16 for DL and 16 for UL. When CA is configured, the UE may only have one RRC connection with the NW. At the RRC connection establishment/re-establishment/handover, a serving cell may provide the NAS mobility information. Conversely, at the RRC connection re-establishment/handover, a serving cell may provide the security input. This cell is referred to as the PCell. Depending on the UE capabilities, SCells may be configured to form, together with the PCell, a set of serving cells. Accordingly, the configured set of serving cells for a UE may always consist of one PCell and one or more SCells.

Configured Grant: A gNB allocates UL resources for the initial HARQ transmissions to the UEs. Two types of configured grants (CGs) are defined:

Type 1: One RRC message directly provides the configured UL grant (including the periodicity).

Type 2: One RRC message defines the periodicity of the configured UL grant while PDCCH addressed to CS-RNTI may either signal and activate the configured UL grant, or deactivate the configured UL grant. In other words, one PDCCH addressed to the CS-RNTI may indicate that the UL grant may be implicitly reused, according to the periodicity defined by the RRC message until the UL grant is deactivated.

When one configured uplink grant is active, if the UE fails to find its C-RNTI/CS-RNTI/MCS-C-RNTI on the PDCCH(s), one UL transmission according to the configured UL grant may be made. Otherwise, if the UE finds its C-RNTI/CS-RNTI/MCS-C-RNTI on the PDCCH(s), the PDCCH allocation may override the configured UL grant. In some implementations, the usage of MCS-C-RNTI may be equivalent to that of the C-RNTI in the MAC procedures (e.g., except for the C-RNTI MAC CE).

HARQ: A functionality that ensures delivery between peer entities at the first layer, L1 (i.e., Physical Layer). A single HARQ process supports one TB when the physical layer is not configured for DL/UL spatial multiplexing, and when the physical layer is configured for DL/UL spatial multiplexing, a single HARQ process supports one or multiple TBs. There is one HARQ entity per serving cell. Each of the HARQ entities may support a parallel number of DL and UL HARQ processes.

HARQ-ACK: A HARQ-ACK information bit value of '0' represents a NACK while a HARQ-ACK information bit value of '1' represents an ACK.

Timer: The MAC entity may setup one or more timers for individual purposes, for example, triggering some UL signaling retransmissions or limiting some UL signaling retransmission periods. A timer may run once the timer is started until the timer is stopped or expired; otherwise, the timer is not running. A timer may be started if the timer is not running or may be restarted if the timer is running. A Timer is always started or restarted from its initial value. The initial value may be, but is not limited to, configured by the gNB via DL RRC signaling or pre-defined/pre-determined value addressed in a specification.

BWP: A subset of the total cell bandwidth of a cell is referred to as a BWP and Bandwidth Adaptation (BA) is achieved by configuring the UE with BWP(s) and instructing the UE of which of the configured BWPs is currently the active one. To enable the BA on the PCell, the gNB configures the UE with UL and DL BWP(s). To enable BA on SCells in the case of CA, the gNB configures the UE with DL BWP(s), at least (e.g., there may be no BWP in the UL). For the PCell, the initial BWP is the BWP used for initial access. For the SCell(s), the initial BWP is the BWP configured for the UE to first operate at the SCell's activation. The UE may be configured with a first active UL BWP by a firstActiveUplinkBWP IE. If the first active UL BWP is configured for an SpCell, the firstActiveUplinkBWP IE field may contain the ID of the UL BWP to be activated upon performing the RRC (re-)configuration. If this field is absent, the RRC (re-)configuration does not impose a BWP switch. If the first active UL BWP is configured for an SCell, the firstActiveUplinkBWP IE field may contain the ID of the UL BWP to be used upon the MAC-activation of an S Cell.

PDCCH: In the DL, the gNB may dynamically allocate resources to UEs via the C-RNTI/MCS-C-RNTI/CS-RNTI on PDCCH(s). A UE always monitors the PDCCH(s) in order to find possible assignments when its DL reception is enabled (e.g., activity that is governed by the DRX when configured). When CA is configured, the same C-RNTI may apply to all serving cells.

PDSCH/PUSCH: The PDCCH may be used to schedule the DL transmissions on the PDSCH and the UL transmissions on the PUSCH.

Time Alignment Timer: This timer is for the maintenance of UL time alignment, where the timeAlignmentTimer is per timing advance group that is maintained. The timer controls how long the MAC entity considers the serving cells belonging to the associated TAG to be the UL time aligned. The initial value of the timer may be configured by the gNB.

TB: The data from the upper layer (or MAC) given to the physical layer is referred to as TB.

LBT: The gNB and UE may apply the LBT before performing a transmission on the NR-U cells. When the LBT is applied, the transmitter listens to/senses the channel to determine whether the channel is free or busy and performs the transmission only if the channel is considered to be free.

NR-U: NR Radio Access operating in the Unlicensed Spectrum may operate in a PCell, an SCell, or a PSCell.

The terms, definitions and abbreviations as given in this document are either imported from existing documentation (ETSI, ITU or elsewhere) or newly created by 3GPP experts whenever the need for precise vocabulary was identified.

RA Procedure

Figure 2:
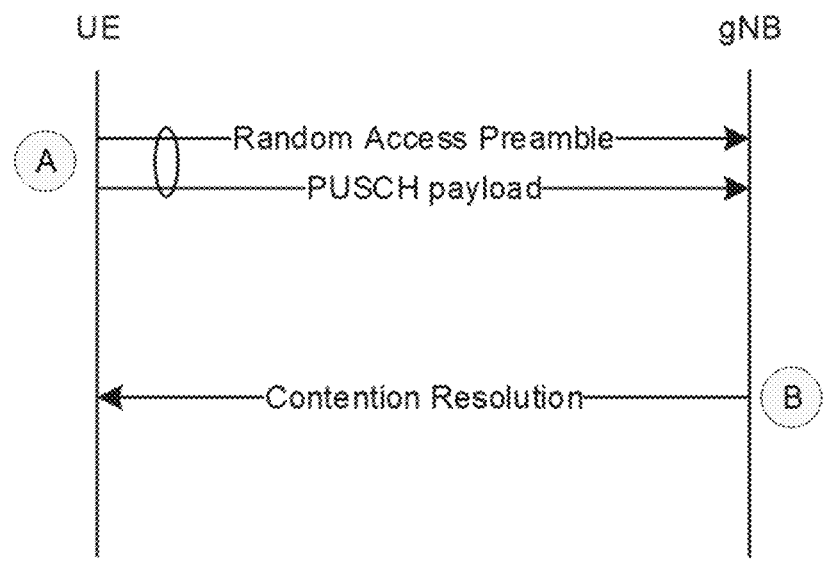
FIG. 2 is a schematic diagram illustrating a 2-step Contention Based Random Access procedure, according to an example implementation of the present disclosure.
Figure 3:
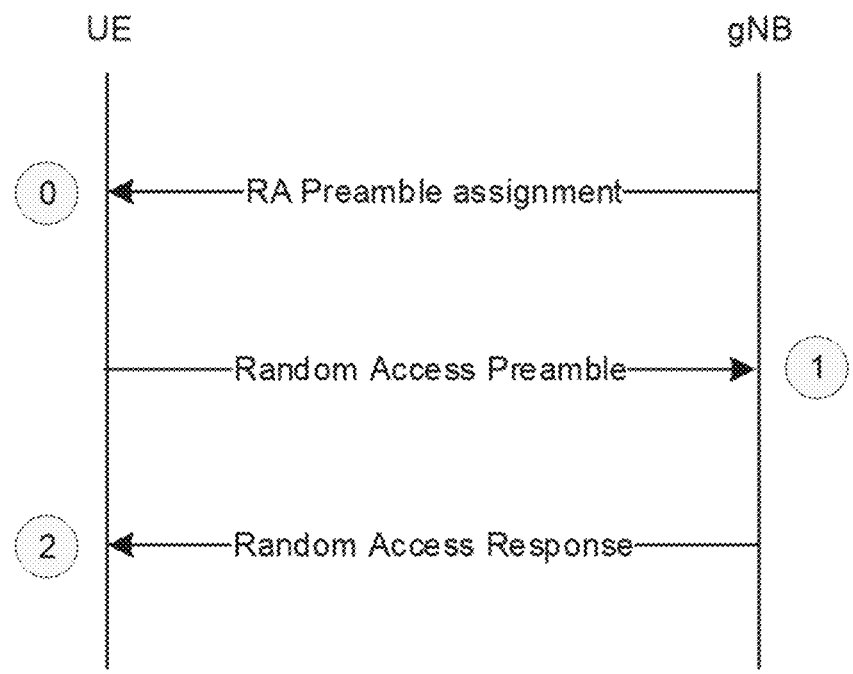
FIG. 3 is a schematic diagram illustrating a Contention Free Random Access procedure, according to an example implementation of the present disclosure.

FIG. 1 is a schematic diagram illustrating a 4-step Contention Based Random Access procedure, according to an example implementation of the present disclosure, FIG. 2 is a schematic diagram illustrating a 2-step Contention Based Random Access procedure, according to an example implementation of the present disclosure, and FIG. 3 is a schematic diagram illustrating a Contention Free Random Access procedure, according to an example implementation of the present disclosure. To be similar with the 4-step RA procedure, the 2-step RA procedure is supported in next generation cellular wireless communication systems (e.g., 3GPP NR wireless communication system). Some embodiments support, at least, three types of RA procedures which may include the 4-step CBRA, as shown in FIG. 1, the 2-step CBRA, as shown in FIG. 2, and the CFRA, as shown in FIG. 3.

Figure 4:
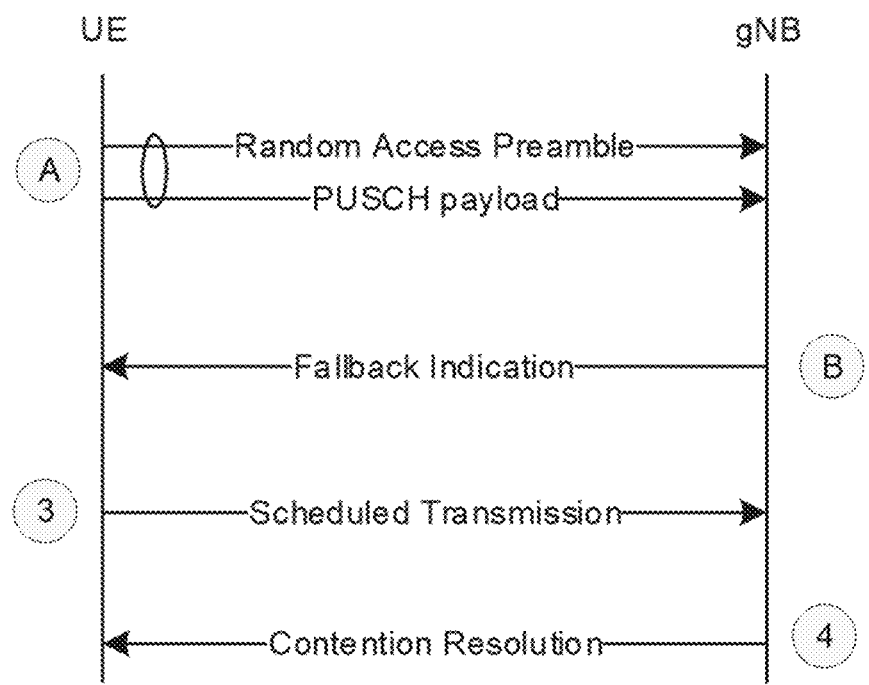
FIG. 4 is a schematic diagram illustrating a fallback from the 2-step random access (RA) procedure to the 4-step RA procedure, according to an example implementation of the present disclosure.

The MsgA of the 2-step CBRA includes a preamble transmission on the PRACH and a payload transmission on the PUSCH (A). After the MsgA transmission, the UE monitors the DL for a response from the NW, for example, within a configured window. If contention resolution (B) is successful upon receiving the NW response, the UE ends the RA procedure, as shown in FIG. 2. FIG. 4 is a schematic diagram illustrating a fallback from the 2-step RA procedure to the 4-step RA procedure, according to an example implementation of the present disclosure. If a fallback indication (B) is received in the MsgB, the UE performs the Msg3 (e.g., Msg3 of the 4-step RA procedure) transmission (3) and monitors the contention resolution (4), as shown in FIG. 4.

After the Msg3 (re)transmission(s), the UE goes back to MsgA transmission if contention resolution is not successful. If the 2-step RA procedure is not successfully completed after a configured number of MsgA transmissions, the UE switches to the 4-step CBRA procedure.

For an RA in a serving cell configured with the SUL, the NW may explicitly signal the carrier it uses (e.g., UL or SUL). Alternatively, the UE selects the SUL carrier if and only if the measured quality of the DL is lower than a broadcast threshold. The UE performs carrier selection before selecting between the 2-step RA procedure and the 4-step RA procedure. Once started, all UL transmissions of the RA procedure remain on the selected carrier.

In NR, three RRC states are supported: RRC_CONNECTED, RRC_IDLE and RRC_INACTIVE states. A UE (or UE's RRC layer) may be in one of the three RRC states. Except for the UL data transmission during an RA procedure, in general, UL data transmission is only allowed to be performed by the UE in an RRC_CONNECTED state. It should be noted that the UL data transmission mentioned in the present disclosure may include a UE transmitting data to a gNB, and the data may be transmitted on the PUSCH or some other physical UL channel(s). In a legacy RA procedure, the amount of data which can be carried by the MsgA or Msg3 are limited. That is, the PUSCH resource granted by the gNB for the MsgA and Msg3 transmissions is mainly for the data from the CCCH (data oriented from RRC layer). Once the UE needs to transmit UL data (e.g., UL data that is not from the CCCH) to the gNB and the UE is not in an RRC_CONNECTED state (e.g., an RRC_IDLE or RRC_INACTIVE state), even though the amount of data is small, the UE still needs to trigger and perform the RRC connection establishment or RRC connection resume procedure for transitioning to the RRC_CONNECTED state. Consequently, infrequent small UL data transmission by the UE may result in power consumption spent on the signaling overhead applied for the RRC state transition. Hence, from power saving perspective of the UE, it is beneficial to introduce some new mechanisms to the UE for performing small data transmission while in an RRC_INACTIVE and/or RRC_IDLE state without switching/transitioning the RRC state. More specifically, the small data transmission mechanism may be performed through the RA procedure and/or through the configured grant. It should be noted that the small data mentioned in the present disclosure may include data from the logical channel which is associated with any of the SRB and/or DRB (and/or associated with one or more DRB(s) allowed/configured for the SDT).

PDCCH

In an NR wireless communication system, a DL data reception at the UE side is achieved by monitoring the PDCCH to find a possible assignment, where the assignment may be represented as (UE specific) DCI, and the DCI may be found on the PDCCH via blind decoding. From the implementation of the blind decoding aspect, the UE may be configured with a set of PDCCH candidates within one or more CORESETs. The PDCCH candidate set for the UE to monitor is defined in terms of PDCCH search space sets (or only search space sets). A search space set can be categorized into two types, i.e., either a CSS set or a USS set. A UE may monitor the PDCCH candidates according to one or more configured search space sets to decode the possible PDCCH transmitted by the gNB. In other words, one PDCCH may be found in the PDCCH candidates within the monitored search space sets. Specifically, the UE monitors a set of PDCCH candidates in one or more CORESETs and/or Search Spaces on a DL BWP (e.g., one active DL BWP on each activated serving cell or one initial BWP on a camped cell) configured with PDCCH monitoring, according to corresponding search space sets, where the monitoring implies decoding each PDCCH candidate according to the monitored DCI formats. That is, the DCI with CRC bits scrambled by UE specific RNTI (e.g., C-RNTI) is carried by the PDCCH, and the DCI is found by the UE descrambling the CRC bits with the RNTI.

Based on the mechanism introduced above, one implementation, the DCI may indicate a DL data reception on the PDSCH. Furthermore, an UL data transmission on the PUSCH may be scheduled by a DCI as well. That is, the DCI indicates time and frequency locations of the PUSCH.

Afterward, corresponding UL data (e.g., TB) transmission on the PUSCH at the UE side may be performed by utilizing the UL grant.

In another implementation, the DCI may also indicate the DL data corresponding to HARQ feedback (e.g., HARQ-ACK) related instruction. That is, the DCI indicates time and frequency locations of the PDSCH and indicates timing at which the UE may perform the corresponding HARQ-ACK transmission.

CORESET and Search Space

The UE monitors PDCCH candidates within one or more CORESETs, where one CORESET may be represented as a specific radio resource indicated by the gNB via one or more configurations (e.g., ControlResourceSet IE). The one or more configurations may be transmitted by the gNB to the UE via broadcast SIB or dedicated (e.g., unicast) signaling. A CORESET may have a particular width in the frequency domain as well as a particular width in the time domain, which may be indicated by the ControlResourceSet IE. In the time domain, the CORESET may be periodically appeared. The exact positions of the CORESETs in the time domain may be preconfigured to the UE by the gNB through a SearchSpace IE. Each ControlResourceSet is indexed with a CORESET ID which may be carried by the ControlResourceSet IE. Similarly, each SearchSpace is indexed with a SearchSpace ID which may be carried by the SearchSpace IE. Each of the configured SearchSpace IEs may be associated with one ControlResourceSet IE that is indicated through the SearchSpaces IE. By providing the associated ControlResourceSet IE and SearchSpaces IE to the UE, the gNB may indicate the CORESET to the UE for example, for PDCCH monitoring.

Each search space may be further be categorized as CSS or USS which is indicated by the gNB to the UE via corresponding SearchSpace, where the CSS is shared by one or more than one UEs within the same serving cell. The UE may be indicated multiple search spaces, where each search space may be applied by the gNB for different purposes. For example, a SearchSpace may be indicated for the purpose of random access and another SearchSpace may be indicated for the purpose of normal data transmission/reception scheduling.

Configuration Details of CORESET

Figure 5:
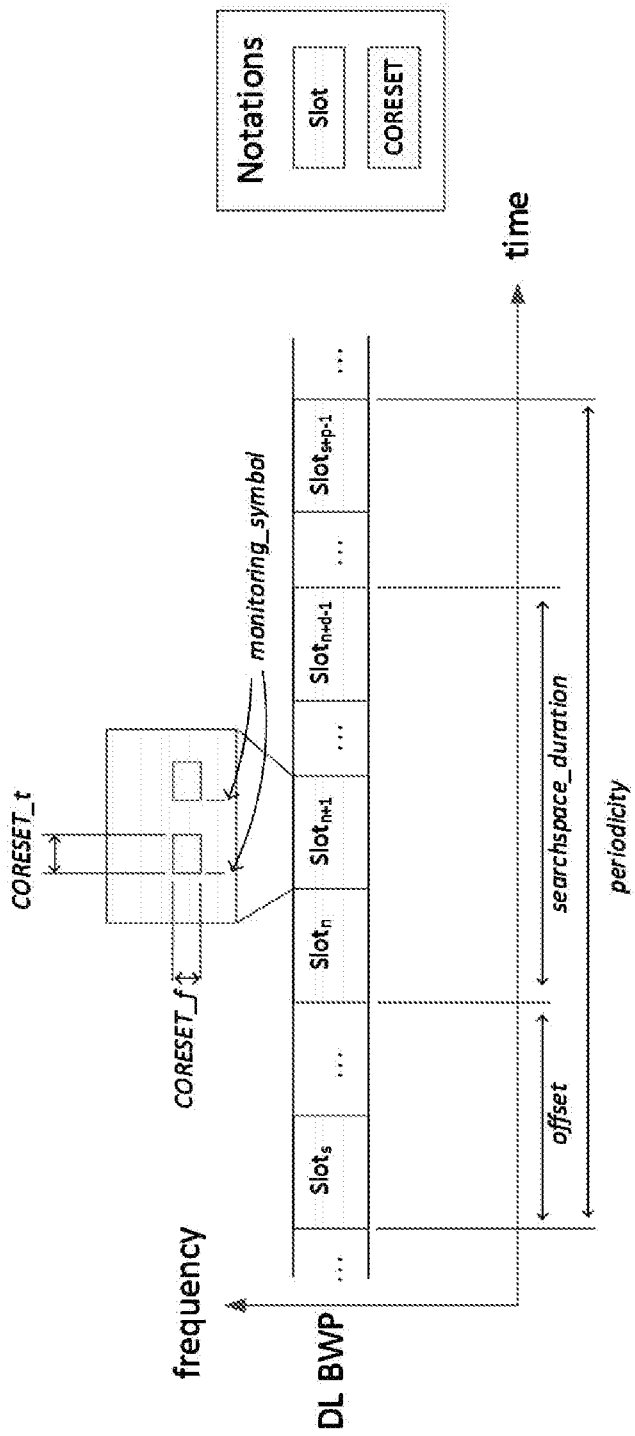
FIG. 5 is a schematic diagram illustrating physical downlink control channel (PDCCH) monitoring and configuration, according to an example implementation of the present disclosure.

FIG. 5 is a schematic diagram illustrating PDCCH monitoring and configuration, according to an example implementation of the present disclosure. The ControlResourceSet IE may include at least the following parameters: CORESET_t and CORESET_f. The SearchSpace IE may include at least the following parameters: offset, searchspace_duration, periodicity and monitoring_symbol, where the definition of the CORESET_t, CORESET_f offset, searchSpace_duration, periodicity and Monitoring_symbol may refer to the illustration in FIG. 5 and may be described as follows.

According to the frame structure defined in NR, a system frame includes ten subframes. Each of the subframes includes multiple slots, where the number of slots within one subframe may depend on the configuration of SCS. There is always an integer number of slots in a subframe. In some implementations, in the time domain, the system frames appear consecutively. As shown in FIG. 5, dividing the frame structure into slot level, the slots appear consecutively along with the time axis, where the horizontal axis represents the time domain and the vertical axis represents the frequency domain.

Based on the frame structure described above, the gNB indicates to the UE on which slots among these consecutive slots the UE may perform PDCCH monitoring by providing the ControlResourceSet IE and SearchSpace IE. For each DL BWP configured to one UE in a serving cell, the UE is provided with at least a ControlResourceSet IE and a SearchSpace IE.

In some implementations, the parameters offset, searchspace_duration and periodicity may include, but is not limited to, an integer value with unit of slot. That is, the offset, searchspace_duration and periodicity may be represented as an integer number (of slots). The parameter CORESET_t may include, but is not limited to, an integer value with unit of symbol. That is, the CORESET_t may be represented as an integer number (of symbols). The CORESET_f may include, but is not limited to, one or more (e.g., a group) of resource blocks (RBs). The monitoring_symbol may be represented as an index of symbol.

Figure 6:
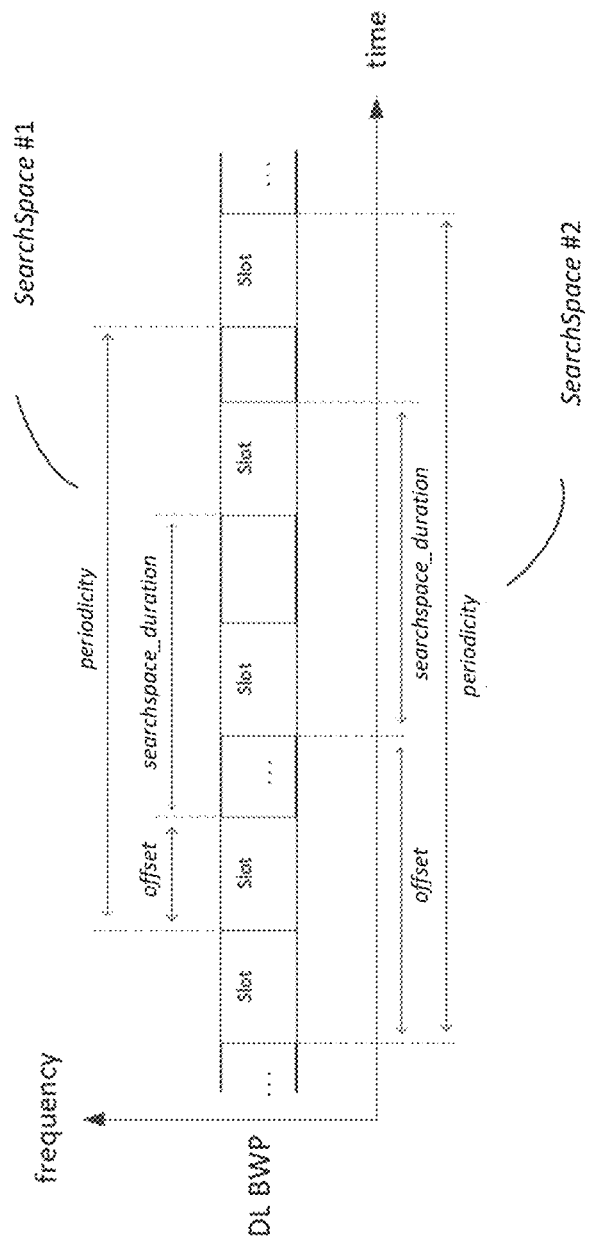
FIG. 6 is a schematic diagram illustrating multiple PDCCH configurations, according to an example implementation of the present disclosure.

In one implementation, for each configured DL BWP, the gNB may provide multiple sets of associated CORESETs and SearchSpaces to the UE. Each set of associated CORESETs and SearchSpaces provides an offset, searchspace_duration, periodicity, CORESET_t, CORESET_f and/or monitoring_symbol. In some implementations, the UE may perform the PDCCH monitoring configured by each set of associated CORESETs and SearchSpaces. FIG. 6 is a schematic diagram illustrating multiple PDCCH configurations, according to an example implementation of the present disclosure. As shown in FIG. 6, the UE is provided with two SearchSpace IEs (i.e., SearchSpace #1 and SearchSpace #2, as shown in FIG. 6) associated with a single DL BWP. The UE may perform PDCCH monitoring configured by both of the SearchSpace #1 and SearchSpace #2.

Based on the SearchSpace IE, a serial number of the consecutive slots are grouped together as a PDCCH monitoring period. A PDCCH monitoring period includes periodicity of the consecutive slots. Within each PDCCH monitoring period, the UE performs PDCCH monitoring on a portion of the slots. More specifically, the UE performs PDCCH monitoring on a number (e.g., indicated by searchspace_duration)_consecutive slots that starts from offset slots after the beginning of a PDCCH monitoring period. In one implementation, as shown in FIG. 5, a PDCCH monitoring period includes a serial number of consecutive slots that starts from $Slot_s$ and end on $Slot_{s+p-1}$. Within the PDCCH monitoring period, the UE performs the PDCCH monitoring on a serial number of consecutive slots that starts from $Slot_n$ and end on $Slot_{n+d-1}$, where the $Slot_n$ has an offset in $Slot_s$ after the $Slot_s$, i.e., 'n–s' is equal to offset, 'd' is equal to searchspace_duration and 'p' is equal to periodicity.

During the searchspace_duration consecutive slots, the UE may only need to monitor the PDCCH on a portion of the symbols of each slot. The portion of symbols are determined by CORESET_t and monitoring_symbol. That is, within each slot, the UE may monitor the PDCCH that starts from the symbol indicated by monitoring_symbol and continues the monitoring for CORESET_t of consecutive symbols. In some implementations, the UE may need to perform the PDCCH monitoring on consecutive symbols multiple times, as $Slot_{n+1}$ being illustrated in FIG. 5. That is, there may be multiple symbol indices that are indicated by the gNB via the monitoring_symbol.

In one implementation, the gNB may provide multiple monitoring_symbol configurations to the UE. Each of the monitoring_symbol configurations indicates a symbol index. In another implementation, the gNB may provide a single monitoring_symbol associated with a BWP, and the monitoring_symbol carries multiple symbol indices.

SDT Via RA

Figure 7:
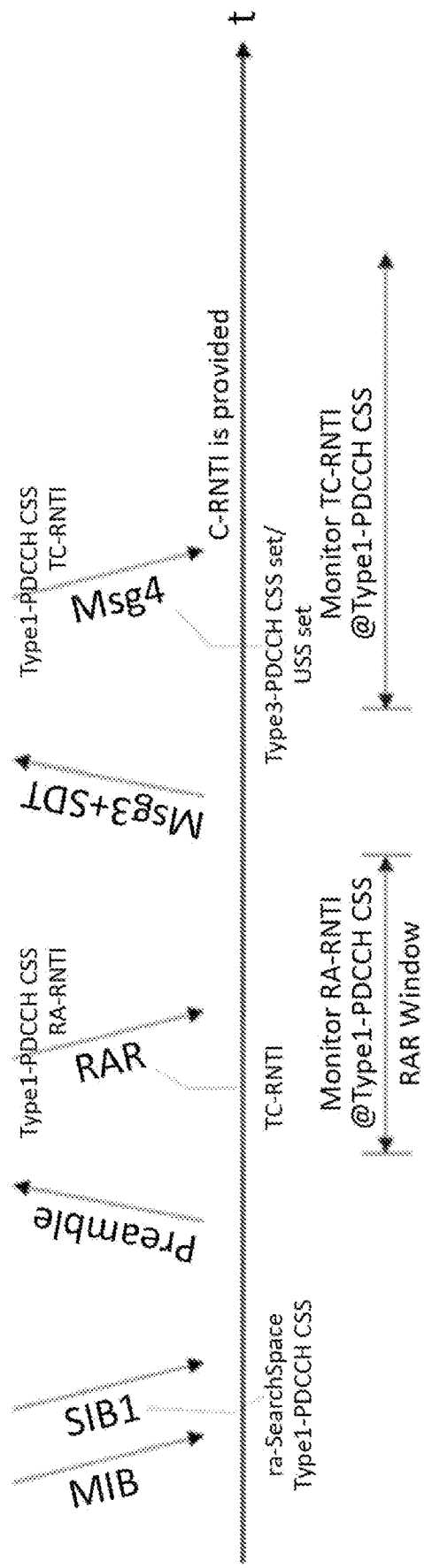
FIG. 7 is a schematic diagram illustrating performing small data transmission SDT via an RA procedure, according to an example implementation of the present disclosure.

In some implementations, the SDT may be performed during an RA procedure while the UE is in an RRC_INACTIVE or RRC_IDLE state. FIG. 7 is a schematic diagram illustrating performing SDT via an RA procedure, according to an example implementation of the present disclosure. As shown in FIG. 7, after initiating an RA procedure, the UE may transmit a small amount of data along with (or within) the Msg3 and/or the MsgA of the RA, where the Msg3, as shown in FIG. 7, is different form the Msg3, as shown in FIG. 1. Specifically, the Msg3 in FIG. 7 may not only carry data from the CCCH (e.g., an RRC message) but may also carry the (small) data and/or MAC CEs, where the RRC message may include, but is not limited to, an UL RRC message that is applied for transmitting a request for resuming the RRC connection (e.g., RRCResumeRequest message, RRCResumeRequest1 message), or for setting up an RRC connection (e.g., RRCSetupRequest message). The data may include one or more MAC SDUs and the MAC SDUs are multiplexed with another MAC SDU within the RRC message and/or MAC CEs into a MAC PDU by the MAC entity of the UE, where the MAC PDU is transmitted to the gNB via the UL grant received in the RA response or via the MsgA in PUSCH.

As shown in FIG. 7, after the UE transmits an RA preamble on the PRACH, the UE monitors one PDCCH candidate on a specific type of search space within a RAR window. The search space may be a type1-PDCCH CSS (e.g., as defined in 3GPP technical specification TS 38.213). The DCI with CRC bits scrambled by an RA-RNTI carried by a PDCCH within the monitored search space may be decoded by the UE, and the DCI schedules a PDSCH reception, where the PDSCH carries a RAR. A UL grant and a TC-RNTI may be contained in the RAR message, i.e., the MAC PDU, as defined in 3GPP TS 38.321. Afterward, the UE may transmit one MAC PDU (e.g., in the Msg3) that carries the RRC message to the gNB on the PUSCH indicated by the UL grant. The Msg3 may additionally contain the data (e.g., the MAC SDU) and/or the MAC CE. An Msg4 reception is performed afterward by the UE after the Msg3 transmission. Contention resolution is performed after the reception of the Msg4. The UE may apply the TC-RNTI as C-RNTI if the contention resolution is successful, which is denoted as the "C-RNTI is provided" in FIG. 7. It is important to know which search space(s) the UE needs to apply for the PDCCH monitoring for the DCI with CRC bits scrambled by the C-RNTI. For simplicity, the "PDCCH monitoring for the DCI with CRC bits scrambled by the C-RNTI" may be interpreted as "PDCCH monitoring for C-RNTI" or "monitoring PDCCH for C-RNTI" or "monitoring search space for C-RNTI" or "monitoring C-RNTI in PDCCH" or "monitoring C-RNTI in search space," and the "monitor PDCCH for DCI with CRC bits scrambled by the C-RNTI" may be interpreted as "monitor C-RNTI on the PDCCH."

In one implementation, after the C-RNTI is provided, the UE may monitor the DCI with CRC bits scrambled by the C-RNTI in a search space that is the same as the search space applied by the UE to monitor the PDCCH for the RAR reception. That is, the UE may monitor the DCI with CRC bits scrambled by the C-RNTI in the Type1-PDCCH CSS, as shown in FIG. 7. In another implementation, the UE may monitor C-RNTI on the Type1-PDCCH CSS, where the configuration of the Type1-PDCCH CSS may be pre-configured by the gNB, either in SIB1 and/or other system information blocks, or may be preconfigured by the gNB (e.g., via unicast RRC signaling).

Subsequent Data Transmission or Reception

After initiating an RA procedure for the SDT and the reception of the Msg4 of the 4-step RA procedure or the MsgB of the 2-step RA procedure, the UE may continue the subsequent data transmission and/or data reception while it stays in the RRC_INACTIVE state. The subsequent data transmission and/or data reception may include, but is not limited to, a UL data transmission (or a DL reception) that is delivered after the UE transmits one UL data on the UL resource in response to receiving the RAR. The further/additional/subsequent data transmission and/or data reception may be achieved by starting to monitor the C-RNTI on one or multiple specific search spaces for receiving the DCI from the gNB. The DCI may schedule UL resources for the data transmission or may transmit a DL assignment for data reception. In one implementation, the search space may be applied for the UE to monitor the C-RNTI after the Msg4 is received (e.g., the C-RNTI is provided). In another implementation, the other solution is also introduced based on when the UE starts to monitor the C-RNTI on the search space.

In some implementations, the concept of "the Msg4 is received" may be interpreted as one or more alternatives listed as below:
(1) The C-RNTI is provided: In this implementation, the contention resolution (of the RA initiated for the SDT transmission) is considered as successful if the Msg4 is received. When the contention resolution is successful, the UE considers the TC-RNTI is received in the RAR of the RA as the C-RNTI (i.e., the C-RNTI is provided).
(2) The C-RNTI is provided with more details: It is similar to the previous alternative, i.e., the contention resolution (of the RA initiated for the SDT transmission) is considered as successful if the Msg4 is received, where the Msg4 may, but is not limit to, carry a RRCRelease message (with or without suspendConfig) that is received in response to an RRCResumeRequest or an RRCResumeRequest1. When the contention resolution is successful, the UE replaces the C-RNTI (being stored in the RRC_INACTIVE state) with the TC-RNTI that is received in the RAR of the RA procedure (e.g., when the C-RNTI is provided).

Figure 8:
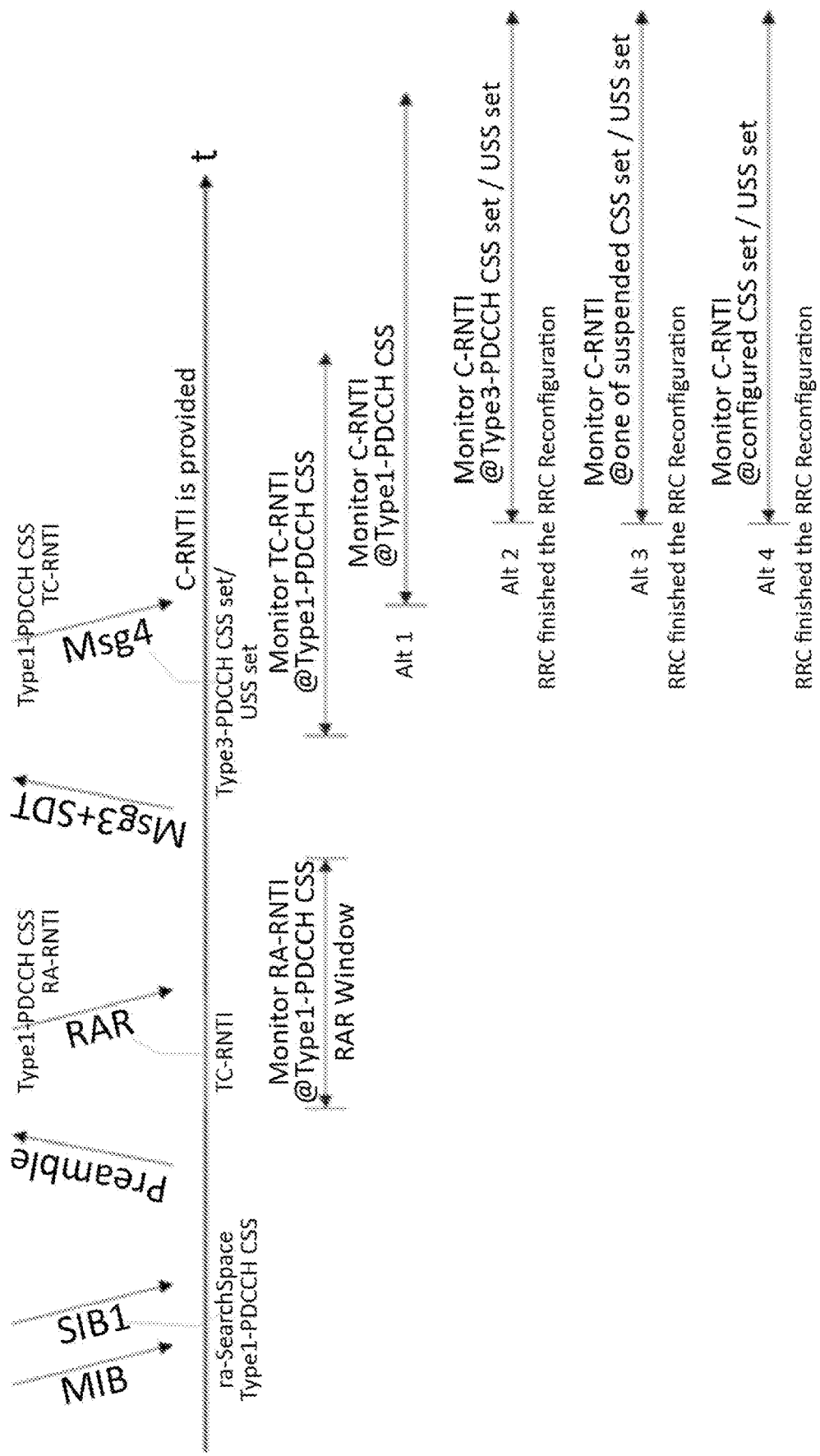
FIG. 8 is a schematic diagram illustrating the UE monitoring the C-RNTI after the C-RNTI being provided, according to an example implementation of the present disclosure.
Figure 9:
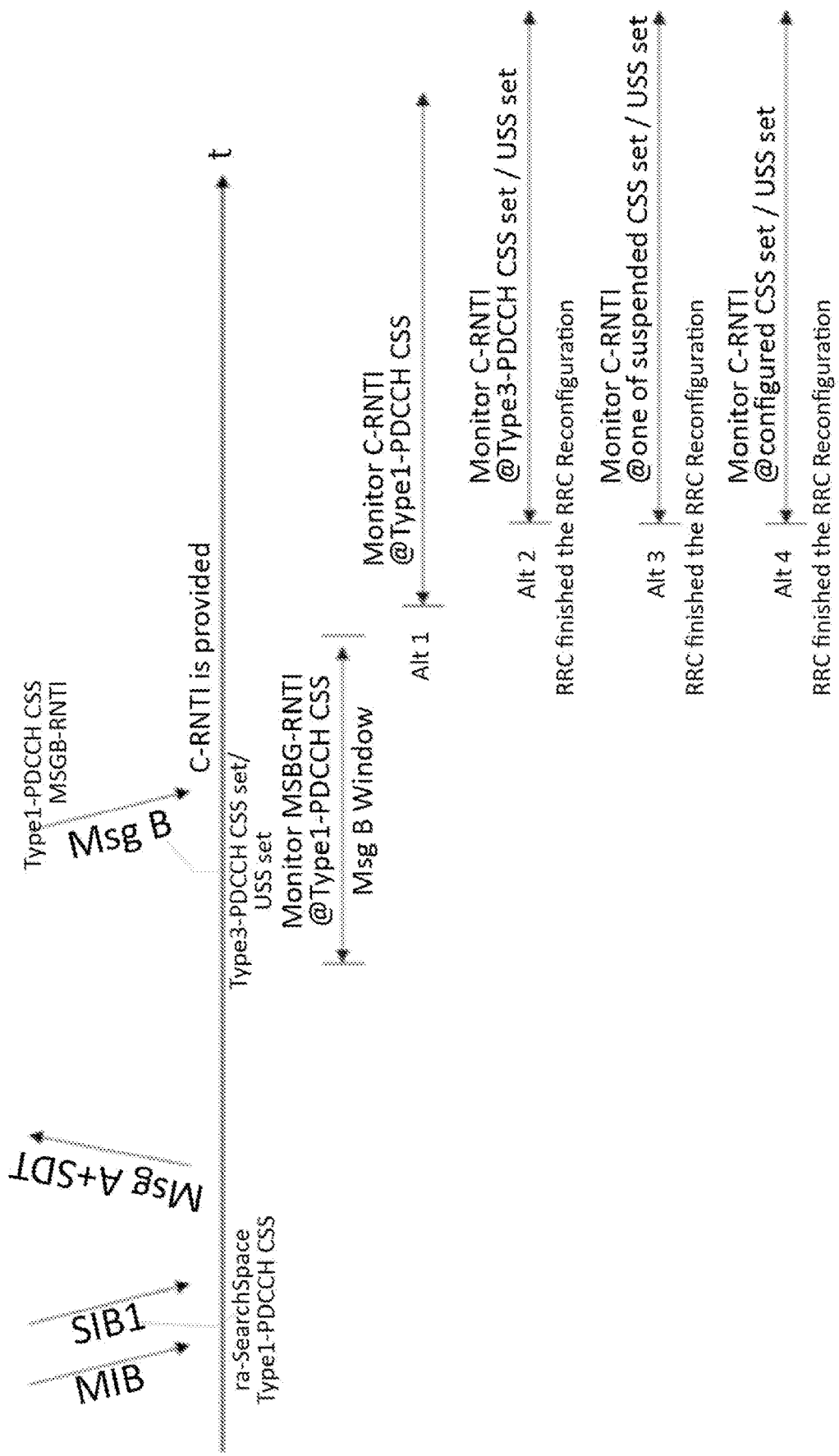
FIG. 9 is a schematic diagram of the UE monitoring the C-RNTI after the C-RNTI being provided for the 2-step RA procedure, according to an example implementation of the present disclosure.

FIG. 8 is a schematic diagram illustrating the UE monitoring the C-RNTI after the C-RNTI being provided, according to an example implementation of the present disclosure, and FIG. 9 is a schematic diagram illustrating the UE monitoring the C-RNTI after the C-RNTI being provided for the 2-step RA procedure, according to an example implementation of the present disclosure. As shown in FIG. 8, there are several alternatives on which the search space is applied for the UE to monitor the C-RNTI after the Msg4 is received (e.g., after the C-RNTI is provided/replaced (or), while the C-RNTI is stored (e.g., in the UE Inactive AS Context), while the C-RNTI is still valid (e.g., the UE still stays in the same cell providing the C-RNTI)), as well as when the UE starts to monitor the C-RNTI on the search space. The Msg4 may be in a DL transmission which may carry an RRCRelease message (e.g., including suspendConfig), an RRCResume message, an RRCSetup message, or a message that includes only a contention resolution MAC CE. In one implementation, the Msg4 may also be represented as an MsgB of the 2-step RA procedure, as shown in FIG. 9. In other words, all of the embodiments in the present disclosure for the Msg4 may also be applied to the MsgB. More detail of these alternatives follows.

Alternative 1: In one implementation, the UE starts to monitor the C-RNTI on the Type1-PDCCH CSS after the Msg4 is received. In another implementation, the UE starts to monitor the C-RNTI on the Type1-PDCCH CSS after the C-RNTI is provided or after the Msg4 is received, only when the Msg4 does not carry any other search space or CORESET configuration. Conversely, the UE does not need to monitor the C-RNTI on the Type1-PDCCH CSS after the C-RNTI is provided (or after the Msg4 is received), if the Msg4 carries at least one search space or CORESET configuration. Specifically, the at least one search space or CORESET configuration is configured by the gNB for a subsequent SDT transmission/reception (e.g., scheduled by the DCI with CRC bits scrambled by the C-RNTI) after the Msg4 is received.

Alternative 2: In one implementation, the UE starts to monitor the C-RNTI on a specific CSS and/or a specific USS after the Msg4 is received, where the specific CSS may include, but is not limited to, a Type3-PDCCH CSS. The Type3-PDCCH CSS and/or the USS may be configured by the gNB via a specific configuration/indication carried by the Msg4, where the specific configuration/indication may include RRC signaling or a MAC CE or PHY signaling (or a field within the DCI). In another implementation, the UE starts to monitor the C-RNTI on the Type3-PDCCH CSS and/or the USS after the UE receives the configuration/indication and finishes the configuration/indication corresponding to the (RRC) reconfiguration. In another implementation, the UE starts to monitor the C-RNTI on the Type3-PDCCH CSS and/or the USS after the UE receives the configuration/indication and finishes the configuration/indication corresponding to the (RRC) reconfiguration, as well as when the UE finishes the transmission of the HARQ-ACK for the Msg4.

Alternative 3: In one implementation, the UE starts to monitor the C-RNTI on a specific CSS and/or a specific USS after the Msg4 is received, where the specific CSS may include, but is not limited to, a Type3-PDCCH CSS. The Type3-PDCCH CSS and/or the USS may be pre-configured by the gNB via a specific configuration/indication while the UE is in an RRC_CONNECTED state, and the configuration of the Type3-PDCCH CSS and/or the USS may be suspended after the UE is suspended (e.g., transitioned) from the RRC_CONNECTED to the RRC_INACTIVE state. In another implementation, the Type3-PDCCH CSS and/or the USS may be pre-configured by the gNB via a specific configuration/indication during a suspension procedure of the RRC connection. For example, the Type3-PDCCH CSS and/or the USS may be pre-configured by the gNB via a specific configuration/indication carried by the RRCRelease message. It should be noted that the RRCRelease message may include a suspend configuration, where the specific configuration/indication may include RRC signaling or a MAC CE or PHY signaling (or a field within the DCI). In another implementation, the UE starts to monitor the C-RNTI on the Type3-PDCCH CSS and/or the USS after the UE receives the configuration/indication and finishes the configuration/indication corresponding to the (RRC) reconfiguration.

In one implementation, the UE starts to monitor the C-RNTI on a specific CSS and/or a specific USS after the Msg4 is received and a search space indication (SSI) is received. In another implementation, the UE starts to monitor the C-RNTI on a specific CSS and/or a specific USS when the SSI is received and the C-RNTI is still valid/available. The SSI may include, but is not limited to, an RRC IE/MAC CE/DCI/field of the DCI, where the SSI may be carried by (along with) the Msg4 (e.g., an RRCRelease message or an RRCResume message or an RRCSetup message).

In another implementation, the UE may be preconfigured with multiple (e.g., a set) of search space configurations and/or CORESET configurations while the UE is in an RRC_CONNECTED state or during the suspension procedure of the RRC connection. In one example, while the UE is in the RRC_CONNECTED state, the gNB provides the (set of) search space configurations as well as CORESET configurations to the UE via dedicated DL RRC signaling (e.g., RRCReconfiguration). In another example, during the suspension procedure of the RRC connection, the gNB provides the (set of) search space configurations as well as CORESET configurations to the UE via dedicated DL RRC signaling (e.g., RRCRelease). The configurations may be carried by the suspendconfig of the RRCRelease, as defined in the TS 38.331. In one implementation, the search space configurations as well as CORESET configurations may be stored in a UE Inactive AS context. Accordingly, the gNB may further indicate to the UE which search space(s) and/or CORESET(s) configurations should be applied for monitoring the C-RNTI via the SSI. The SSI may include, but is not limited to, a SearchSpace ID and/or CORESET ID.

In another implementation, if the SSI is not present, the UE may monitor at least one of the preconfigured search space sets associated with CORESET 0 and/or the preconfigured search space sets associated with the CORESET configured by commonControlResourceSet. In another implementation, if the SSI is not present, the UE may monitor at least one of the preconfigured search space sets associated with CORESET 0 if commonControlResourceSet is not provided in SIB-1, and the UE may monitor at least one of the preconfigured search space sets associated with the CORESET configured by commonControlResourceSet, if commonControlResourceSet is provided in SIB-1. The at least one search space set may include the search space set that has the smallest search space ID.

In another implementation, the SSI may be a BWP ID. The UE may start to monitor the C-RNTI in one or more (or all) search spaces configured on the BWP associated with the BWP ID.

In another implementations, during the suspension procedure of the RRC connection or while the UE is in the RRC_CONNECTED state, the UE may be indicated by the gNB of one (or multiple) search space configuration(s) and/or CORESET configuration(s) that is (are) needed to be applied by the UE for monitoring the C-RNTI while the UE is in RRC_INACTIVE/RRC_IDLE state and after the Msg4 reception of the RA procedure initiated for the SDT. The SSI may be a 'TRUE/FALSE' indicator. The SSI indicating "TRUE" implies that the UE needs to monitor the C-RNTI after receiving the SSI. Alternatively, the SSI indicating "FALSE" may imply that the UE does not need to monitor the C-RNTI after receiving the Msg4/SSI.

In another implementation, during the suspension procedure of the RRC connection or while the UE is in the RRC_CONNECTED state, the UE may be indicated by the gNB of one (or multiple) search space configuration(s)

and/or CORESET configuration(s) that is (are) needed to be applied by the UE for monitoring the C-RNTI while the UE is in the RRC_INACTIVE/RRC_IDLE state and after the Msg4 reception of the RA procedure initiated for the SDT. After the Msg4 reception of the RA procedure initiated for the SDT, the UE needs to monitor the C-RNTI only after the Msg4 carries the SSI and/or the UE has a valid C-RNTI. Alternatively, the UE may be unnecessary to monitor the C-RNTI after receiving the Msg4 if the SSI is not carried by the Msg4. In another implementation, the interpretation of 'after receiving the Msg4' may be the time that the UE finishes the RRC reconfiguration corresponding to the Msg4. Specifically, the Msg3 may include a new RRC Resume cause that indicates a purpose of sending the Msg3 is for the SDT. The gNB may treat the operations of the UE initiating the RA procedure for an initial access and initiating the RA procedure for the SDT as different operations, where the UE shares the RA resource for the above operations. When the new RRC Resume cause is carried in the Msg3 and the SSI is not carried by the Msg4, the UE may not be needed to monitor the C-RNTI after receiving the Msg4.

In another implementation, during the suspension procedure of the RRC connection or while the UE is in the RRC_CONNECTED state, the UE may be indicated by the gNB of one (or multiple) search space configuration(s) as well as CORESET configuration(s) that is (are) needed to be applied by the UE for monitoring the C-RNTI while the UE is in the RRC_INACTIVE state or RRC_IDLE state and after the Msg4 reception of the RA procedure initiated for the SDT. The SSI may be a bitmap carried by one RRC/MAC CE/field of the DCI, and each bit of the bitmap is represented as a 'TRUE/FALSE' indicator. Each bit of the bitmap is associated with a search space configuration and/or CORESET configuration. That is, a bit associated with one search space or one CORESET will indicate the corresponding search space or the CORESET is needed to be applied for monitoring the C-RNTI after the Msg4 reception. In one example, the bit that is associated with the search space/CORESET indicating "1" means that the UE needs to monitor the C-RNTI after receiving the Msg4/SSI. Alternatively, the bit indicating "0" means that the UE does not need to monitor the C-RNTI after receiving the Msg4/SSI. Furthermore, each bit within the bitmap may be associated with one search space ID or one CORESET ID in ascending or descending order. In one example, a Least Significant Bit (LSB) of the bitmap may be associated with the smallest or largest value of the search space ID or the CORESET ID, and a Most Significant Bit (MSB) of the bitmap may be associated with the largest or smallest value of the search space ID or the CORESET ID.

In another implementation, the SSI may include two sub-indicators (i.e., Sub-SSI (S-SSI)), i.e., S-SSI1 and S-SSI2. The S-SSI1 may be a 'TRUE/FALSE' indicator. The S-SSI1 indicating "TRUE" implies that the UE needs to monitor the C-RNTI after receiving the Msg4; alternatively, the S-SSI1 indicating "FALSE" implies that the UE does not need to monitor the C-RNTI after receiving the Msg4. In addition, the S-SSI2 may be interpreted as an indicator indicating a SearchSpace ID and/or CORESET ID as introduced in that above-described Alternative 3. Once the S-SSI2 is not indicated to the UE, the UE may monitor at least one of the preconfigured search space sets associated with CORESET 0 and/or the preconfigured search space sets associated with the CORESET configured by commonControlResourceSet. In another implementation, if the S-SSI2 is not present, the UE may monitor at least one of the preconfigured search space sets associated with CORESET 0 if commonControlResourceSet is not provided in the SIB-1, and may monitor at least one of the preconfigured search space sets associated with the CORESET configured by commonControlResourceSet, if commonControlResourceSet is provided in the SIB 1. The at least one search space set may include the search space set that has the smallest search space ID.

In another implementation, once the Msg3 and the SDT (i.e., Msg3+SDT) are transmitted by the UE to another gNB (cell) which is not the same gNB by which the UE is suspended, the UE may discard all the stored search space/coreset configurations configured for the subsequent SDT transmission (as described above). In the meantime, the UE may receive a new search space/coreset configuration in the Msg4 in response to the RRCResume transmitted in the Msg3. In another implementation, once the Msg3+SDT are transmitted by the UE to another gNB (cell) which belongs to a RAN notification area (RNA) and is different from the gNB through which the UE is suspended, the UE may discard all the stored search space/coreset configurations configured for the subsequent SDT transmission (as discussed above). In the meantime, the UE may receive a new search space/coreset configuration in the Msg4 in response to the RRCResume transmitted in the Msg3.

Alternative 4: In one implementation, the UE starts to monitor the C-RNTI on a specific CSS and/or a specific USS after the Msg4 is received, where the specific CSS may include, but is not limited to, a Type3-PDCCH CSS. The Type3-PDCCH CSS and/or the USS may be configured by the gNB via the Msg4, and the configuration may include, but is not limited to, ControlResourceSet IE and/or SearchSpace IE.

Alternative 5: In one implementation, the UE starts to monitor the C-RNTI on all CSS and/or all USS associated with a DL BWP after the Msg4 is received, where the DL BWP is the BWP applied by the UE for the RAR reception, and the CSS may include, but is not limited to, a Type3-PDCCH CSS. In another implementation, the DL BWP may be a BWP that is indicated by the gNB via the Msg4. In one example, the gNB may indicate to the UE a BWP ID along with the Msg4. In another implementation, the DL BWP may be a BWP associated with specific services/slices/applications (e.g., Multicast Broadcast service (MBS) BWP).

Alternative 6: In one implementation, the UE starts to monitor the C-RNTI on a specific CSS and/or a specific USS after the Msg4 is received only when the UE has transmitted a buffer status report (BSR) MAC CE to the gNB along with the Msg3 or MSGA PUSCH transmission. In another implementation, the UE starts to monitor C-RNTI on a specific CSS and/or a specific USS after the C-RNTI is provided or after the Msg4 is received only when the UE has transmitted a BSR MAC CE to the gNB along with the Msg3 or MsgA PUSCH transmission, and the value indicated in the BSR MAC CE may satisfy a specific condition. In one example, the specific condition may include, but is not limited to, a numerical value that is not equal to zero or is higher than a threshold. Alternatively, once the UE transmits a BSR with a numerical value being zero or lower than a threshold, the UE stops the monitoring of the C-RNTI on the search space. The BSR may be specific to a subset of LCH(s) configured by the gNB. The subset of LCH(s) is associated with a radio bearer that supports the SDT (service). Furthermore, the UE may discard the C-RNTI after stopping the C-RNTI monitoring, where the threshold may be broadcast (e.g., via SIB1 or other SIB) by the gNB or preconfigured by the gNB while the UE is in an RRC_CONNECTED state and/or during the suspension of the RRC connection (i.e., RRCRelease). The threshold may be cell specific or UE specific or RNA area specific configuration. In some implementations, a new LCID may be used for a new format of a BSR MAC CE for the LCH(s) and/or LCH(s) which is associated with a DRB configured/allowed for the SDT.

Alternative 7: In one implementation, the UE starts to monitor the C-RNTI on a specific CSS and/or a specific USS after the C-RNTI is provided or after the Msg4 is received only when the Msg4 includes an RRCRelease message or an RRCResume message.

Alternative 8: Based on an assumption that the UE does not need to monitor the C-RNTI on a specific CSS and/or a specific USS after the Msg4/MsgB reception for subsequent data transmission or data reception, the UE may also does not need to monitor the C-RNTI on Type1-PDCCH CSS or a search space that is configured for monitoring the RA-RNTI.

Alternative 9: In one implementation, the UE may be indicated a configured grant configuration. The indication may be achieved by receiving an indicator carried in the Msg4/MsgB or DL signaling after the Msg4/MsgB reception. The DL signaling may be scheduled by the C-RNTI monitored on the search space and/or CORESET. The indicator may include, but is not limited to, a configured grant configuration ID, where the configured grant configuration and the configured grant configuration ID are preconfigured by the gNB while the UE is in the RRC_CONNECTED state and/or during the suspension of the RRC connection (e.g., RRCRelease message). Once the UE receives the configured grant configuration ID in the Msg4/MsgB or DL signaling after the Msg4/MsgB reception, the UE performs the subsequent SDT on the indicated configured grant configuration. In another implementation, if the size of a subsequent data volume is smaller than a defined threshold, the UE may not need to monitor the C-RNTI on the Type1-PDCCH CSS or a search space that is configured for monitoring the RA-RNTI, where the threshold may be a default value or may be configured by an RRC message.

Time Interval of PDCCH Monitoring for C-RNTI after Msg4/MsgB

While describing the monitoring of the C-RNTI on a specific search space(s), one fundamental question may be how long (i.e., a time interval) the UE may continue the PDCCH monitoring for the C-RNTI after the Msg4/MsgB reception of the RA procedure initiated for the SDT. Some alternatives for controlling and/or configuring the time interval are as follows.

Alternative 1: The UE may be preconfigured with a timer. Once the Msg4/MsgB is received, the UE starts the timer. While the timer is running, the UE keeps monitoring the C-RNTI on the search space, as described above. In some implementations, the initial value of the timer may be preconfigured by the gNB while the UE is in the RRC_CONNECTED state or during the suspension procedure of the RRC connection (e.g., RRCRelease). The unit of the timer may be configured as second, millisecond (ms), system frame, subframe, slot, symbol, etc. In one implementation, the timer may be explicitly stopped by the gNB via DL signaling (e.g., via DCI or MAC CE or RRC message). In another implementation, the timer may be restarted by the UE once DCI is received during the C-RNTI monitoring. The DCI may include, but is not limited to, a DCI scheduling a new transmission or a new data reception. The DCI may include, but is not limited to, DCI with a field and may be set with a specific value. In another implementation, the timer may be started only when the timer is indicated by the gNB via the Msg4/MsgB. Specifically, in one implementation, the Msg4 may not carry a specific RRC message (e.g., RRCRelease/RRCResume/RRCSetup/RRCRelease, RRCRelease/RRCReject message), i.e., the Msg4 may only be applied for contention resolution. Then, the UE may monitor the C-RNTI in the search space/CORESET, as discussed above, until the timer is stopped (by the gNB/UE) or until the timer is expired or until the specific RRC message is received from the gNB. Alternatively, the timer may be stopped when the specific RRC message is received from the gNB. In another implementation, the timer may be stopped once a measurement result of a preconfigured DL RS satisfies a situation, where the situation may be the RSRP of the RS being lower than and/or equal to a threshold that is indicated by the gNB via broadcast signaling or dedicated DL signaling carried in the Msg2/Msg4 or in the DL signaling while the UE is in the RRC_CONNECTED state.

In one implementation, the UE may stop the timer when the UE receives a paging DCI, short message, or a paging message which indicates the stopping of the timer and that the UE may not need to monitor the specific search space(s) or CORESET(s) for the subsequent DL/UL grants.

In one implementation, the UE may start the timer when the UE receives the Msg4 that does not include an RRC message, e.g., only including contention resolution MAC CE. In one implementation, the UE may stop the timer when the UE receives an RRCRelease message after the MSG4.

Alternative 2: Similar to the implementations of the Alternative 1, the timer is the common time alignment timer (TAT timer) that is introduced in NR for controlling timing advanced and that is defined in the 3GPP TS 38.321. In one implementation, the TAT timer may be started once the RAR is received. While the timer is running, the UE keeps monitoring the PDCCH on the search space, as described above. In another implementation, the TAT timer may be stopped by the UE once the UE is indicated, by the gNB, not to monitor the C-RNTI for the subsequent SDT either in the Msg4 (MsgB) or in any other subsequent transmission, as described above. In one example, the TAT timer may be stopped if the SSI indicates 'FALSE' which may imply that the UE does not need to monitor the C-RNTI after receiving the Msg4/SSI. In another implementation, the timer may be T300 or T301 or T302 or T311 or T319 or T320 or T325 or T380 or T390, as defined in the 3GPP TS 38.331.

Alternative 3: The UE may be preconfigured with a counter. Once the Msg4/MsgB is received, the UE increases a value of the counter by 1. In one implementation, the counter may be increased by 1 only when the counter is indicated by the gNB via Msg4/MsgB. Before the counter reaches a specific threshold, the UE keeps monitoring the search space, as described above. Specifically, the threshold may be preconfigured by the gNB while the UE is in the RRC_CONNECTED state or during the suspension procedure of the RRC connection (e.g., RRCRelease) via DL signaling (e.g., via DCI or MAC CE or RRC message). In another implementation, the value of the counter may be reset to zero (0) by the gNB via DL signaling (e.g., through DCI or MAC CE or RRC message). The counter may be increased by 1 once the DCI is received during the C-RNTI monitoring. The DCI may include, but is not limited to, DCI scheduling a new transmission or a new data reception.

Alternative 4: The UE keeps monitoring the search space, as described above, until an explicit indicator is received from the gNB. The indicator indicates to the UE that the gNB may not schedule any other subsequent UL grant or DL data reception afterward.

In one implementation, once the UE stops the C-RNTI monitoring for the subsequent SDT in any one of the above implementations, the UE may suspend the corresponding search space and/or CORESET configuration. In another implementation, the UE may release part/all of the search spaces and/or CORESET configurations after the UE stops the C-RNTI monitoring for the subsequent SDT. That is, the search space(s) and/or CORESET configuration(s), which is utilized for the C-RNTI monitoring for the SDT after a first initiated RA procedure, may not be applied by the UE for the C-RNTI monitoring for the subsequent data transmission after a second initiated RA procedure for another SDT, where the second initiated RA procedure may be initiated after the UE stops the subsequent transmission for the first initiated RA procedure.

In one implementation, the C-RNTI monitoring, as described above, may be replaced by some other types of C-RNTI. In one implementation, other types of C-RNTI may include MCS-C-RNTI, CS-RNTI, SRS-RNTI, PS-RNTI, SL-RNTI, SL-CS-RNTI, or SL-L-CS-RNTI. In another implementation, the C-RNTI monitoring, as described above, may also be replaced by a new introduced RNTI that is specific for the UE for the subsequent data transmission, and the RNTI may be preconfigured by the gNB while the UE is in the RRC_CONNECTED state or during the suspension procedure of the RRC connection.

In one implementation, the UE may discard the C-RNTI after the UE stops the C-RNTI monitoring in any one of the above implementations.

Figure 10:
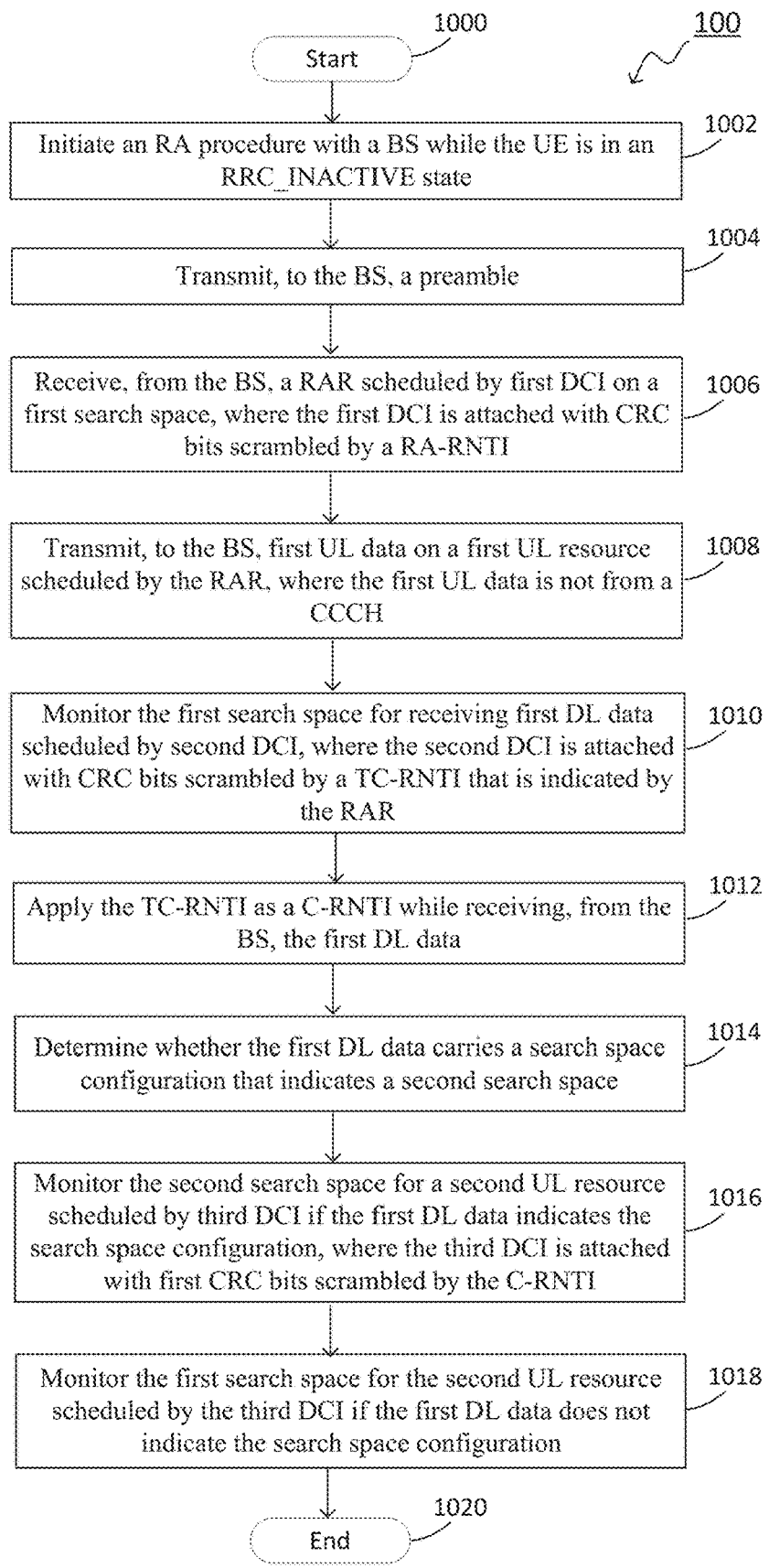
FIG. 10 is a flowchart illustrating a method/process performed by a UE for performing SDT with a base station (BS), according to an example implementation of the present disclosure.

FIG. 10 is a flowchart illustrating a process performed by a UE for performing SDT with a BS, according to an example implementation of the present disclosure. As shown in FIG. 10, the process 100 for the UE includes the following actions:

Action 1000: Start.

Action 1002: Initiate an RA procedure with a BS while the UE is in an RRC_INACTIVE state.

Action 1004: Transmit, to the BS, a preamble.

Action 1006: Receive, from the BS, a RAR scheduled by first DCI on a first search space, where the first DCI is attached with CRC bits scrambled by a RA-RNTI.

Action 1008: Transmit, to the BS, first UL data on a first UL resource scheduled by the RAR, where the first UL data is not from a CCCH.

Action 1010: Monitor the first search space for receiving first DL data scheduled by second DCI, where the second DCI is attached with CRC bits scrambled by a TC-RNTI that is indicated by the RAR.

Action 1012: Apply the TC-RNTI as a C-RNTI while receiving, from the BS, the first DL data.

Action 1014: Determine whether the first DL data carries a search space configuration that indicates a second search space.

Action 1016: Monitor the second search space for a second UL resource scheduled by third DCI if the first DL data indicates the search space configuration, where the third DCI is attached with first CRC bits scrambled by the C-RNTI.

Action 1018: Monitor the first search space for the second UL resource scheduled by the third DCI if the first DL data does not indicate the search space configuration.

Action 1020: End.

In one implementation, the UE may initiate the RA procedure with the BS while the UE is in the RRC_INAC-TIVE state in action 1002. In action 1004, the UE may transmit the preamble to the BS under the RA procedure. In action 1006, the UE may receive the RAR from the BS, where the RAR is scheduled by the first DCI on the first search space (e.g., Type-1 PDCCH CSS) and where the first DCI is attached with CRC bits scrambled by a RA-RNTI. In action 1008, the UE may transmit the first UL data (e.g., Msg3+SDT) to the BS via the first UL resource, where the first UL resource is not from a CCCH and is scheduled by the RAR. In action 1010, the UE may monitor the first search space to receive first DL data (e.g., Msg4), where the first DL data is scheduled by the second DCI with CRC bits scrambled by the TC-RNTI, and the TC-RNTI is indicated by the RAR. In actions 1012 and 1014, the UE may determine to apply the TC-RNTI as the C-RNTI while receiving the first DL data from the BS (e.g., when the contention resolution is successful), and may determine whether the first DL data carries the search space configuration indicating the second search space (i.e., the USS). In actions 1016 and 1018, if the first DL data indicates the search space configuration, the UE may monitor the second search space for the second UL resource (e.g., for transmission of the subsequent SDT); if the first DL data does not indicate the search space configuration, the UE may monitor the second search space for the second UL resource, where the second UL resource is scheduled by the third DCI that is attached with the first CRC bits scrambled by the C-RNTI. In another implementation, the first search space may be the CSS shared with other UEs within a serving cell, and the second search space may be the USS.

In another implementation, the process 100 may further configure the UE to monitor the second search space for second DL data scheduled by fourth DCI if the first DL data indicates the search space configuration, and the fourth DCI is attached with second CRC bits scrambled by the C-RNTI; and monitor the first search space for the second DL data scheduled by the fourth DCI if the first DL data does not indicate the search space configuration.

In another implementation, the UE is configured with a timer, and the process 100 may further configure the UE to monitor the second search space for the second UL resource or the second DL data if the first DL data indicates the search space configuration and the timer is running; and monitor the first search space for the second UL resource or the second DL data if the first DL data does not indicate the search space configuration and the timer is running.

In some implementations, all the designs/embodiment/implementations introduced within this disclosure are not limited to be applied for dealing with the problem mention within this disclosure. For example, the described embodiments may be applied to solve other problems that exist in the RAN of cellular wireless communication systems. In some implementations, all of the numbers listed within the designs/embodiment/implementations introduced within this disclosure are just examples and for illustration, for example, of how the described methods are executed.

In some implementations, the DL RRC message mentioned in the present disclosure may include, but is not limited to, RRCReconfiguration, RRCResume, RRCReestablishment, RRCSetup or any other DL unicast RRC message.

In some implementations, "a specific configuration is per UE configured" or "a specific configuration is configured for a UE" mentioned in the present disclosure may represent the specific configuration that is, but is not limited to, configured within a DL RRC message.

In some implementations, "a specific configuration is per cell group configured" or "a specific configuration is configured for a cell group" mentioned in the present disclosure may represent the specific configuration that is, but is not limited to, configured within a CellGroupConfig or MAC-CellGroupConfig or PhysicalCellGroupConfig IE.

In some implementations, "a specific configuration is per serving cell configured" or "a specific configuration is configured for a serving cell" mentioned in the present disclosure may represent the specific configuration that is, but is not limited to, configured within a ServingCellConfigCommon or ServingCellConfig or PUSCH-ServingCellConfig or PDSCH-ServingCellConfig In some implementations, "a specific configuration is per UL BWP or per BWP configured" or "a specific configuration is configured for a UL BWP or for a BWP" mentioned in the present disclosure may represent the specific configuration that is, but is not limited to, configured within a BWP-Uplink or BWP-UplinkDedicated or BWP-UplinkCommon or PUSCH-ConfigCommon or PUSCH-Config IE.

In some implementations, "a specific configuration is per DL BWP or per BWP configured" or "a specific configuration is configured for a DL BWP or for a BWP" mentioned in the present disclosure may represent the specific configuration that is, but is not limited to, configured within a BWP-Downlink or BWP-DownlinkDedicated or BWP-DownlinkCommon or PDSCH-ConfigCommon or PDSCH-Config IE.

In some implementations, the "transmitted" within all the implementations/embodiments introduced above can be defined as corresponding MAC CE/MAC PDU/layer 1 signaling/higher layer signaling, and is started to be transmitted or completely transmitted or is already delivered to corresponding HARQ process/buffer for transmission. The "transmitted" within all the implementations/embodiments introduced above can also be defined as the HARQ_ACK feedback (e.g., one response from the gNB) of the MAC PDU carrying the MAC CE/MAC PDU/layer 1 signaling/higher layer signaling is received. The "transmitted" within all the implementations/embodiments introduced above can also be defined as corresponding MAC CE/MAC PDU is built. In addition, the "HARQ_ACK feedback" can be implemented as a DCI format 0_0, 0_1 or some other format of the DCI that is received by the UE from the gNB on the PDCCH. The received DCI contains a NDI which is set to a specific value (e.g., set to the value '1'), and the DCI also indicates a HARQ process ID that is the same as a HARQ process ID applied by/indicated to be used for the HARQ process of the MAC PDU transmission.

In some implementations, the PDCCH mentioned in the present disclosure is transmitted by the gNB to the UE; alternatively, it is introduced that the PDCCH is received by the UE from the gNB. The PDSCH mentioned in the present disclosure is transmitted by the gNB to the UE; alternatively, it is introduced that the PDSCH is received by the UE from the gNB. The PUSCH mentioned in the present disclosure is transmitted by the UE to the gNB; alternatively, it is introduced that the PUCCH is received by the gNB from the UE.

In some implementations, a PDSCH/PDSCH/PUSCH transmission may span multiple of symbols in time domain. A time duration of one PDSCH/PDSCH/PUSCH (transmission) implies a time interval that starts from the beginning of the first symbol of the PDSCH/PDSCH/PUSCH (transmission) and ends at the end of the last symbol of the PDSCH/PDSCH/PUSCH (transmission).

In some implementations, the term "interrupt" within the present disclosure may have the same meaning as "stop", "cancel" or "skip" mentioned in the present disclosure. The term "instruct the PHY to generate acknowledgement" can have the same meaning as "instruct the PHY to perform HARQ-ACK feedback" in the present disclosure. The term "acknowledgement" may have the same meaning as "HARQ-ACK" or "HARQ-ACK feedback" in the present disclosure. Also, "the UE may not need to perform the corresponding HARQ feedback" in the present disclosure may equal to "the HARQ entity/HARQ process may not need to perform the corresponding HARQ feedback".

In some implementations, "by specific Physical layer signaling" in the present disclosure may indicate, but is not limited to, the meaning that:
 by a specific format of a DCI;
 by a specific field of a DCI;
 by a specific field of a DCI, and the field is set to a specific value; or
 by a DCI with CRC bits scrambled with a specific RNTI;

In the present disclosure, "a MAC timer" may include, but is not limited to, configured by one RRC which is indicated by the gNB. The UE may be configured with an initial value of the timer and the unit of the value may include, but is not limited to, frame/sub-frame/milli second/sub-milli second/slot/symbol. The timer may be started and/or restarted by the UE (e.g., by UE's MAC entity). The timer may be started and/or restarted by the UE (e.g., by UE's MAC entity) when some specific condition is satisfied.

Figure 11:
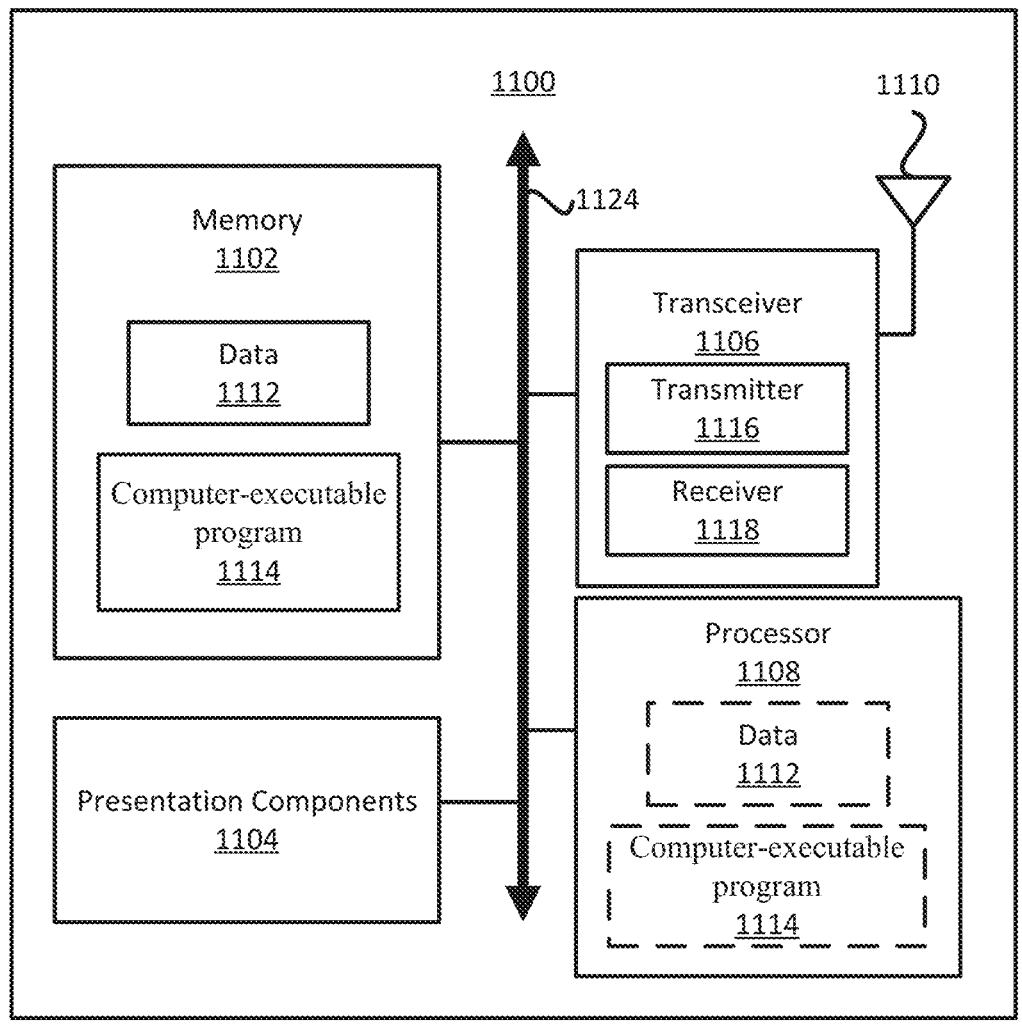
FIG. 11 is a block diagram illustrating a node for wireless communication, according to an example implementation of the present disclosure.

FIG. 11 is a block diagram illustrating a node 1100 for wireless communication according to an example implementation of the present disclosure. As illustrated in FIG. 11, the node 1100 may include a transceiver 1120, a processor 1128, a memory 1134, one or more presentation components 538, and at least one antenna 1136. The node 1100 may also include a radio frequency (RF) spectrum band module, a BS communications module, a network communications module, and a system communications management module, Input/Output (I/O) ports, I/O components, and a power supply (not illustrated in FIG. 11).

Each of the components may directly or indirectly communicate with each other over one or more buses 1140. The node 1100 may be a UE or a BS that performs various functions disclosed with reference to FIGS. 1 through 10.

The transceiver 1120 has a transmitter 1122 (e.g., transmitting/transmission circuitry) and a receiver 1124 (e.g., receiving/reception circuitry) and may be configured to transmit and/or receive time and/or frequency resource partitioning information. The transceiver 1120 may be configured to transmit in different types of subframes and slots including but not limited to usable, non-usable, and flexibly usable subframes and slot formats. The transceiver 1120 may be configured to receive data and control channels.

The node 1100 may include a variety of computer-readable media. Computer-readable media may be any available media that may be accessed by the node 1100 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 1134 may include computer-storage media in the form of volatile and/or non-volatile memory. The memory 1134 may be removable, non-removable, or a combination thereof. Example memory may include solid-state memory, hard drives, optical-disc drives, etc. As illustrated in FIG. 11, the memory 1134 may store computer-readable, computer-executable instructions 1132 (e.g., software codes) that are configured to cause the processor 1128 to perform various functions disclosed herein, for example, with reference to FIGS. 1 through 10. Alternatively, the instructions 1132 may not be directly executable by the processor 1128 but be configured to cause the node 1100 (e.g., when compiled and executed) to perform various functions disclosed herein.

The processor 1128 (e.g., having processing circuitry) may include an intelligent hardware device, e.g., a Central Processing Unit (CPU), a microcontroller, an ASIC, etc. The processor 1128 may include memory. The processor 1128 may process the data 1130 and the instructions 1132 received from the memory 1134, and information transmitted and received via the transceiver 1120, the base band communications module, and/or the network communications module. The processor 1128 may also process information to be sent to the transceiver 1120 for transmission via the antenna 1136 to the network communications module for transmission to a core network.

One or more presentation components 1138 may present data indications to a person or another device. Examples of presentation components 1138 may include a display device, a speaker, a printing component, and a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method of a User Equipment (UE) for performing Small Data Transmission (SDT), the method comprising:
   initiating a Random Access (RA) procedure with a Base Station (BS) while the UE is in a Radio Resource Control (RRC)_INACTIVE state;
   transmitting, to the BS, a preamble;
   receiving, from the BS, a Random Access Response (RAR) scheduled by first downlink control information (DCI) on a first search space, the first DCI being attached with Cyclic Redundancy Check (CRC) bits scrambled by a Random Access-Radio Network Temporary Identifier (RA-RNTI);
   transmitting, to the BS, first Uplink (UL) data on a first UL resource scheduled by the RAR, the first UL data not being from a Common Control Channel (CCCH);
   monitoring the first search space for receiving first Downlink (DL) data scheduled by second DCI, the second DCI being attached with CRC bits scrambled by a Temporary Cell-Radio Network Temporary Identifier (TC-RNTI) that is indicated by the RAR;
   applying the TC-RNTI as a Cell-Radio Network Temporary Identifier (C-RNTI) while receiving, from the BS, the first DL data;
   determining whether the first DL data carries a search space configuration that indicates a second search space;
   monitoring the second search space for a second UL resource scheduled by third DCI if the first DL data carries the search space configuration, the third DCI being attached with first CRC bits scrambled by the C-RNTI; and
   monitoring the first search space for the second UL resource scheduled by the third DCI if the first DL data does not carry the search space configuration.

2. The method of claim 1, wherein the first search space is a Common Search Space (CSS) shared with other UEs within a serving cell, and the second search space is a UE specific Search Space (USS).

3. The method of claim 1, further comprising:
   monitoring the second search space for second DL data scheduled by fourth DCI if the first DL data carries the search space configuration, the fourth DCI being attached with second CRC bits scrambled by the C-RNTI; and
   monitoring the first search space for the second DL data scheduled by the fourth DCI if the first DL data does not carry the search space configuration.

4. The method of claim 3, wherein the UE is configured with a timer, the method further comprising:
   monitoring the second search space for the second UL resource or the second DL data if the first DL data carries the search space configuration and the timer is running; and
   monitoring the first search space for the second UL resource or the second DL data if the first DL data does not carry the search space configuration and the timer is running.

5. A User Equipment (UE) in a wireless communication system for performing Small Data Transmission (SDT), the UE comprising:
   at least one processor; and
   at least one non-transitory computer-readable medium coupled to the at least one processor, and storing one or more computer-executable instructions that, when executed by the at least one processor, cause the UE to:

initiate a Random Access (RA) procedure with a Base Station (BS) while the UE is in a Radio Resource Control (RRC)_INACTIVE state;

transmit, to the BS, a preamble;

receive, from the BS, a Random Access Response (RAR) scheduled by first downlink control information (DCI) on a first search space, the first DCI being attached with Cyclic Redundancy Check (CRC) bits scrambled by a Random Access-Radio Network Temporary Identifier (RA-RNTI);

transmit, to the BS, first Uplink (UL) data on a first UL resource scheduled by the RAR, the first UL data not being from a Common Control Channel (CCCH);

monitor the first search space for receiving first Downlink (DL) data scheduled by second DCI, the second DCI being attached with CRC bits scrambled by a Temporary Cell-Radio Network Temporary Identifier (TC-RNTI) that is indicated by the RAR;

apply the TC-RNTI as a Cell-Radio Network Temporary Identifier (C-RNTI) while receiving, from the BS, the first DL data;

determine whether the first DL data carries a search space configuration that indicates a second search space;

monitor the second search space for a second UL resource scheduled by third DCI if the first DL data carries the search space configuration, the third DCI being attached with first CRC bits scrambled by the C-RNTI; and monitor the first search space for the second UL resource scheduled by the third DCI if the first DL data does not carry the search space configuration.

6. The UE of claim 5, wherein the first search space is a Common Search Space (CSS) shared with other UEs within a serving cell, and the second search space is a UE specific Search Space (USS).

7. The UE of claim 5, wherein the one or more computer-executable instructions, when executed by the at least one processor, further cause the UE to:

monitor the second search space for second DL data scheduled by fourth DCI if the first DL data carries the search space configuration, the fourth DCI being attached with second CRC bits scrambled by the C-RNTI; and monitor the first search space for the second DL data scheduled by the fourth DCI if the first DL data does not carry the search space configuration.

8. The UE of claim 7, wherein the one or more computer-executable instructions, when executed by the at least one processor, further cause the UE to:

monitor the second search space for the second UL resource or the second DL data if the first DL data carries the search space configuration and the timer is running; and monitor the first search space for the second UL resource or the second DL data if the first DL data does not carry the search space configuration and the timer is running.

* * * * *